United States Patent [19]

Baenen

[11] 4,273,169
[45] Jun. 16, 1981

[54] CABLE SAW FOR TREE HARVESTING APPARATUS

[75] Inventor: Paul W. Baenen, Wausau, Wis.

[73] Assignee: J. I. Case Company, Racine, Wis.

[21] Appl. No.: 29,196

[22] Filed: Apr. 12, 1979

[51] Int. Cl.³ .............................................. A01G 23/08
[52] U.S. Cl. .................................. 144/34 R; 30/379.5; 30/380; 56/290; 83/651.1; 83/830; 299/83
[58] Field of Search ............... 299/82, 83, 84; 30/380, 30/381, 379, 166 R, 379 S; 83/651.1, 830, 831, 832, 928; 145/31; 56/290, 291, 292; 144/34 R, 3 D

[56] References Cited

U.S. PATENT DOCUMENTS

| | | | |
|---|---|---|---|
| 1,175,302 | 3/1916 | Sallee | 83/830 |
| 1,342,213 | 6/1920 | Hanson | 144/34 R |
| 1,443,914 | 1/1923 | Ellison | 83/830 |
| 1,457,761 | 6/1923 | Wilson | 144/34 R |
| 1,537,953 | 5/1925 | Lucich | 144/34 R |
| 1,967,116 | 7/1934 | Gerdetz | 56/290 X |
| 2,648,358 | 8/1953 | Lower | 83/831 X |
| 3,604,479 | 9/1971 | Jordan | 144/34 R |
| 4,081,009 | 3/1978 | Curlett | 83/928 X |

FOREIGN PATENT DOCUMENTS 318367  1/1920  Fed. Rep. of Germany ........ 144/34 R Primary Examiner—W. D. Bray
Attorney, Agent, or Firm—Dressler, Goldsmith, Shore, Sutker & Milnamow

[57] ABSTRACT

A tree harvesting cable saw includes an elongated flexible cable that has a plurality of tubular cutting links located at spaced intervals thereon with reversible drive means for driving the cable saw in either direction of its length. Each cutting link has an axial opening for receiving the cable and a continuous cutting edge on each end extending circumferentially around the entire cable and being spaced therefrom so that the cable can be driven in either direction and sever a tree. The cable saw is supported on a frame through a drive pulley and a driven pulley and is driven by a reversible motor. Preferably, the frame is movable between positions so that the cable saw can be forced through a standing tree to sever the tree adjacent its base.

2 Claims, 6 Drawing Figures

U.S. Patent    Jun. 16, 1981    4,273,169
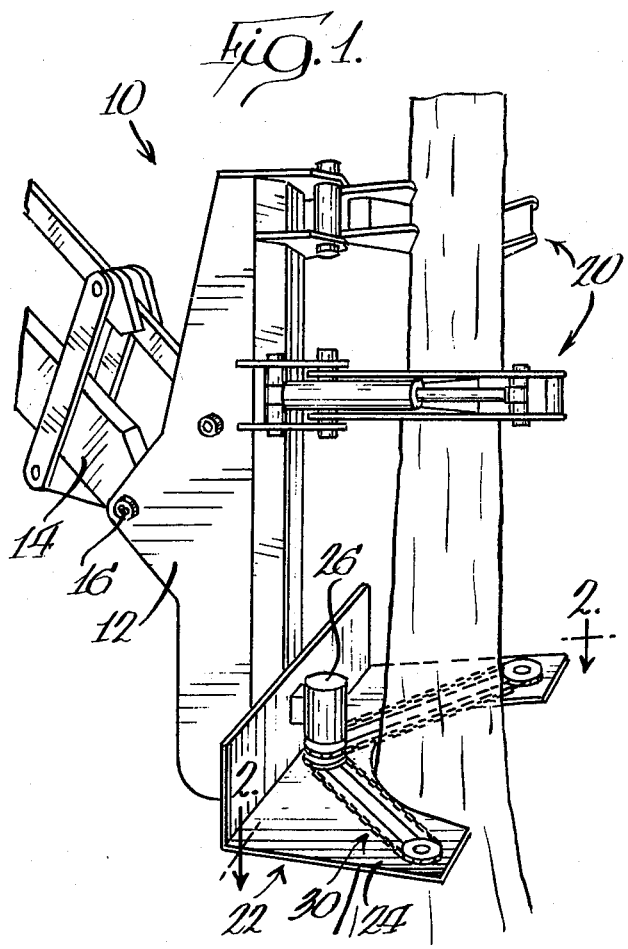
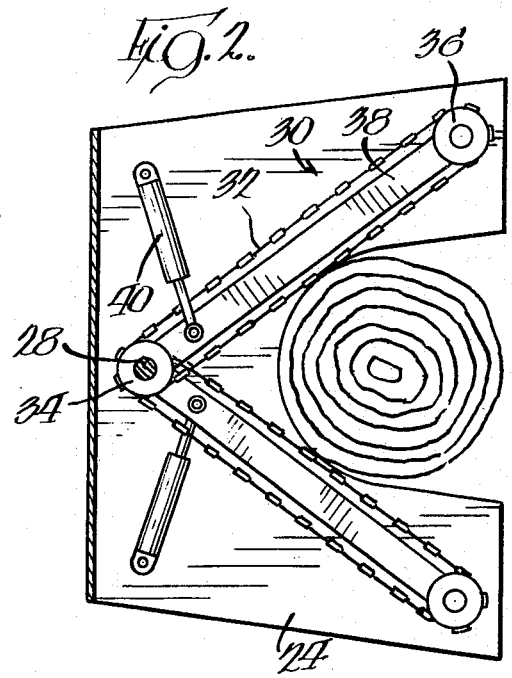
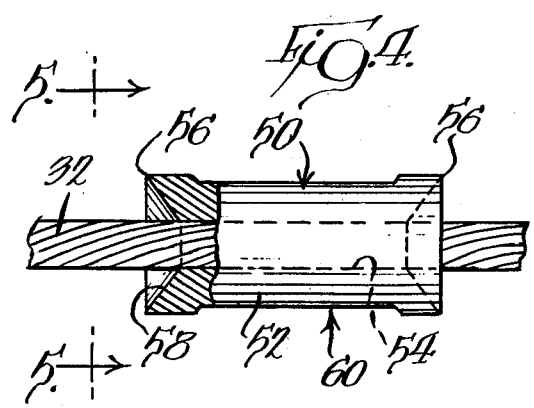
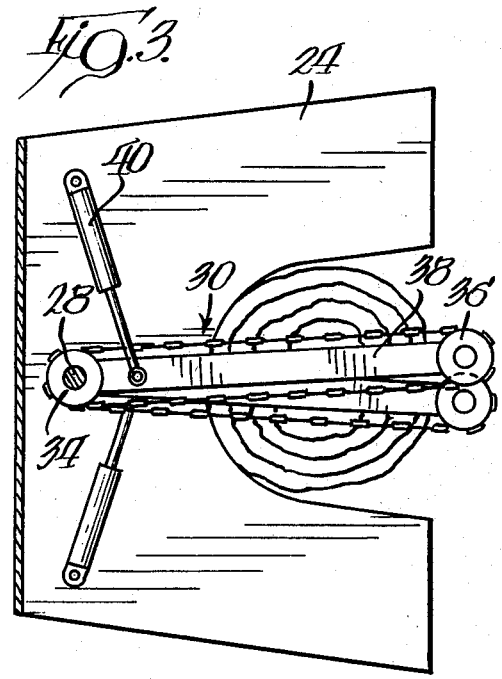
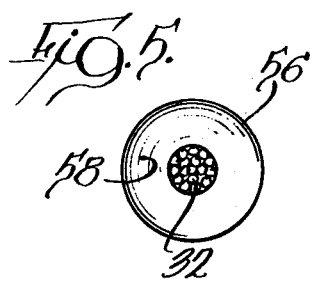
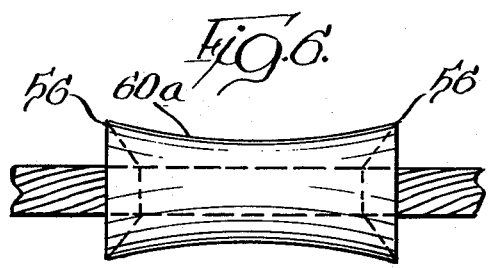

CABLE SAW FOR TREE HARVESTING APPARATUS

TECHNICAL FIELD

The present invention relates generally to mechanical logging equipment or tree harvesting apparatus and is more specifically directed to an improved cutter mechanism for severing a standing tree adjacent its base.

BACKGROUND ART

Numerous types of mechanical logging equipment have been proposed and usually these include some type of cutting mechanism for severing the tree at its base. The most common type of cutter that has been used, particularly in large tree harvesting apparatus is the shear cutter wherein a pair of shear blades are pivoted on a frame and are moved between open and closed positions through drive means, usually in the form of a fluid ram. One of the problems with a shear cutter is that physical force is required to force the sharp edge of the shear through the base of the tree and results in splitting the tree trunk during the severing operation. An example of this type of shear mechanism is disclosed in U.S. Pat. No. 3,575,222.

Another type of cutter that has been proposed is what is commonly referred to as a rotary cutter which is rotated about its own axis and is moved across the base of the tree through some drive mechanism for severing the tree. An example of this type of mechanism is disclosed in U.S. Pat. No. 3,902,538. The problem with the rotary cutter is that initially such cutting units are fairly expensive and also require daily sharpening which decreases the production time and increases the cost per severed tree.

A third type of cutting mechanism is what is commonly referred to as a chain saw which may be mounted on a frame that is movable with respect to a tree. One of the problems encountered with this type of cutting device is that the cutting elements tend to dull rather quickly and are subjected to damage. Another disadvantage is that the cutting apparatus must be rotated in the same direction.

Another type of cutting apparatus that has been known for many years is what is commonly referred to as a cable saw wherein a flexible cable supports a plurality of cutting elements. Examples of this type of saw are disclosed in U.S. Pat. Nos. 641,129; 1,457,761; 1,903,518; 2,043,603; 2,752,964; and 3,958,332.

SUMMARY OF THE INVENTION

According to the present invention, a tree harvesting apparatus incorporates an improved type of cutting apparatus which is capable of being operated in either direction through a reversible motor.

More specifically, the environment to which the present invention pertains includes a frame member that may be pivotally supported on the outer end of a boom that is in turn pivoted on a vehicle turntable rotatable about a generally vertical axis. The frame or tree harvesting head has a gripping means supported thereon for gripping a tree adjacent its base and a cutting means for severing the tree adjacent its base while being gripped by the gripping means.

According to the present invention, the cutting means is in the form of a cable saw that includes a flexible cable having a plurality of cutting links supported at spaced intervals thereon. Each cutting link or element has a generally axial opening extending therethrough with a cutting edge defined on each end of the link and the cutting edges are spaced from the periphery of the opening, more specifically, spaced from the cable extending through the opening. The link is recessed intermediate opposite cutting edges to provide a relief area adjacent the cutting edges.

With each link having a cutting edge on each end thereof, the cable saw can be entrained over a pair of pulleys, one of which is driven by a reversible motor, and the cutting can be accomplished while the motor is operating in either direction. This arrangement substantially doubles the service of the flexible chain saw since the respective cutting edges located on opposite ends of each of the links are severing the tree as the flexible cable saw is moving in either of two directions.

In its specific embodiment, the cable saw consists of a pair of pulleys rotatable about fixed axes on opposite ends of an elongated frame with an endless cable saw entrainer over the respective pulleys and driven by a reversible hydraulic motor. The entire frame is movable between two positions so that the saw can be forced through the tree while being rotated to sever the tree from its base. If desired, two such cutting mechanisms could be supported on a single frame and movable towards and away from each other to perform the cutting from diametrically opposed surfaces with both cutters being driven by a single hydraulic reversible motor supported at a fixed point on the frame and defining the pivot axis for the respective saws.

BRIEF DESCRIPTION OF SEVERAL VIEWS OF DRAWINGS

FIG. 1 discloses a fragmentary view of a tree harvesting head having the present invention incorporated therein;

FIG. 2 is an enlarged plan view of the cutting mechanism as viewed along line 2—2 of FIG. 1;

FIG. 3 is a view similar to FIG. 2 showing the cutting mechanism immediately after a tree has been severed;

FIG. 4 is an enlarged fragmentary view of the details of the cutting element with parts thereof broken away for purposes of clarity;

FIG. 5 is a cross-sectional view as viewed along line 5—5 of FIG. 4; and

FIG. 6 is a view generally similar to FIG. 4 showing the cutting element after sharpening with a disc type grinding wheel.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings generally discloses a tree harvesting head 10 of the type disclosed in U.S. Pat. No. 3,575,222 and assigned to the assignee of the present invention. The overall description in this patent, consistent with the present disclosure, is incorporated herein by reference.

Tree harvesting head 10 includes a main frame that may be pivotally supported on the outer end of a boom 14 through a pivot pin 16. Tree harvesting head 10 also has tree gripping means 20 associated therewith and a tree severing means 22.

According to the present invention, the tree severing means is in the form of a cable saw that has unique cutting links or elements that allow the cable saw to be driven in either direction while severing a tree.

More specifically, the tree cutting apparatus includes a subframe 24 secured to main frame 12 and having a reversible drive means 26 supported thereon with an output shaft 28 for driving a cable saw 30.

Cable saw 30 of the present invention consists of an endless flexible cable 32 that is journaled over a drive pulley 34 fixed to the output shaft of reversible drive means or hydraulic motor 26 and has an idler pulley 36. Preferably, an elongated cutter frame is supported on the axis for the shaft with idler pulley 36 supported on the free end thereof. Frame 38 is moved between positions illustrated respectively in FIGS. 2 and 3 by a further drive means 40, preferably in the form of a cylinder and piston rod assembly or without drive means by the resultant torque of the drive motor 26.

According to the primary aspect of the present invention, elongated flexible cable 32 has a plurality of cutting links 50 supported thereon at spaced intervals. As most clearly illustrated in FIG. 4, each cutting link consists of an elongated tubular body 52 that has a generally circular axial opening 54 extending therethrough with cable 32 threaded through opening 54. Each link has a continuous cutting edge 56 defined on each end thereof and cutting edges extend circumferentially around the entire cable and are spaced therefrom. Each end of the cutting link 50 also has a tapered recess 58 extending from cutting edge 56 towards the periphery of opening 54 to thereby define a sharp edge around the perimeter of body 52.

As indicated above, the respective cutting links are preferably maintained at spaced intervals on the endless cable 32 and in the preferred form, the cutting links or lugs can be crimped onto the cable by standard equipment so as to define a reduced periphery area 60 between the respective cutting edges. This reduced area 60 defines a relief area behind edge cutting edge 56.

If the cable is crimped as described above, the cutting links or lugs could readily be sharpened by utilizing a conventional disc grinder to generally reshape the area between cutting edges 56 to a generally arcuate configuration 60a as illustrated in FIG. 6a. Thus, the links or lugs could readily have both cutting edges simultaneously sharpened by rotating the entire lug about its own axis while being held against a rotating grinder. Since the tapered openings will always intersect at a sharp point with respect to surface 60a, the cutting elements can be resharpened many times without reducing the effectiveness of the cable saw.

One of the advantages of having the cutting edges extend around the entire perimeter of the cutting lug is the fact that only approximately one-half of the diameter of the cutting edge would be utilized at any given time. However, the continuous cutting around the entire perimeter of the cable would insure that a cutting surface is exposed to the tree even if the cable is twisted and therefore the entire circumferential area of the cutting area would ultimately be utilized. Since the cable saw can be driven in either direction and has different cutting edges exposed in the different directions, the service life of the cable saw would be doubled.

In its more specific form illustrated in FIGS. 1, 2 and 3, the cutting means consists of first and second cutting frames both pivotally supported about a pivot axis defined by the axis of the drive shaft for hydraulic motor 26 and the respective cutting frames could have identical cable saws 30 rotated thereon and movable towards and away from each other. Also, having the two cutting mechanisms overlap insures that the tree will be completely severed while being gripped by the grapple arms and will reduce the cutting time to one-half the time per tree.

It should be noted that while the cutting links have been shown as being crimped onto the cable at spaced locations, suitable spacers could be located between adjacent ends of adjacent pairs of cutter links 50 to provide the same spacing. These spacers would of necessity have to have a peripheral diameter less than the diameter of the cutting edge 56. In certain instances, it may also be desirable to eliminate frame 38 and have the idler pulleys guided along an arcuate path on subframe 24 and moved by fluid rams 40, or by torque reaction of the drive motor.

I claim:

1. In a tree harvesting head having a frame with grapple means supported adjacent one end of said frame for gripping a standing tree and cutting means adjacent an opposite end for severing said tree gripped by said gripping means, said cutting means including a reversible motor supported on said frame and having an output shaft, a drive pulley secured to said output shaft and an idler pulley spaced from said shaft with means between said frame and idler pulley for moving said idler pulley between first and second positions, a cable entrained over said pulleys and having a plurality of spaced cutting elements at spaced locations thereon, each cutting element having first and second cutting edges at opposite ends thereof with each cutting edge extending circumferentially around the entire periphery of said cable and being radially spaced therefrom so that said cutting means will sever a tree while being driven in either direction.

2. A tree harvesting head as defined in claim 1, including a second drive pulley secured to said shaft and having a second idler pulley spaced therefrom with a second cable entrained over said second pulleys and having a plurality of said cutting elements at spaced locations thereon, and second means for moving said idler pulley between positions.

* * * * *